July 29, 1969  M. CATY  3,457,825
ELASTIC WASHER
Filed March 27, 1968
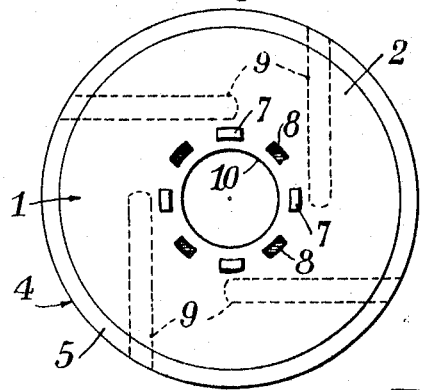
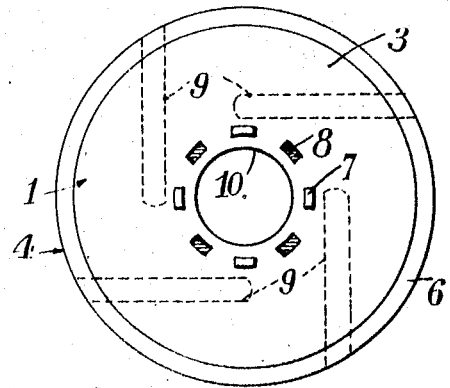
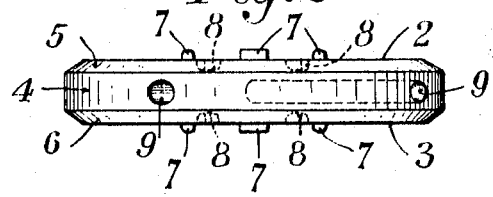
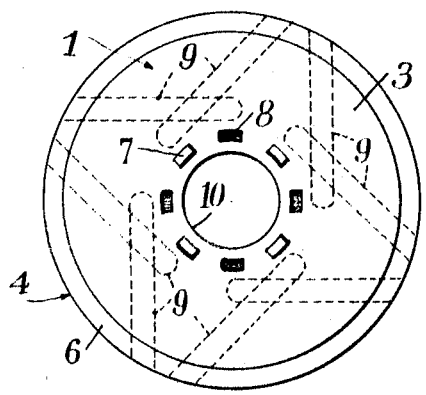
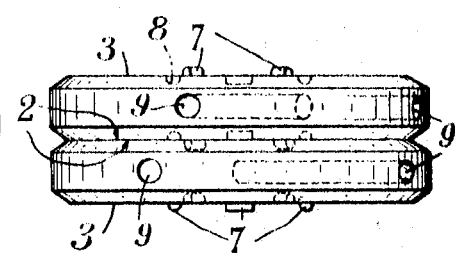

United States Patent Office 3,457,825
Patented July 29, 1969

---

3,457,825
ELASTIC WASHER
Marcel Caty, Bourg-de-Peage, France, assignor to M. Caty & Cie., Societe Anonyme, Bourg-de-Peage, France
Filed Mar. 27, 1968, Ser. No. 716,502
Claims priority, application France, Aug. 23, 1967, 118,738
Int. Cl. F16b *43/00*
U.S. Cl. 85—50                                                2 Claims

ABSTRACT OF THE DISCLOSURE

A resilient washer of polyurethane elastomer. Its object is to provide means for increasing the washer elasticity by reducing its resistance to axial compression, together with means for constituting coherent stacking of washers without any risk of side-slip thereof. This washer comprises a central annular portion limited by parallel planes and a frustoconical outer peripheral portion. Said annular portion comprises a plurality of ribs and grooves alternating from one face to the opposite face of a same washer, and blind holes are formed in the thickness of the washer, between said faces.

---

Background of the invention

This invention relates to an elastic washer made of a relatively hard plastic material, of the polyurethane elastomer type, which comprises an annular portion limited by two parallel planes and an adjacent concentric peripheral portion limited by tapered or rounded surfaces.

These elastic washers are entirely satisfactory, except that under certain service conditions their resistance to axial compression is abnormally high, or otherwise stated they do not yield sufficiently under a given load. Moreover, owing to minor differences in hardness, it may happen that a washer be caused to creep laterally when a stacking thereof is being loaded.

Summary of the invention

To avoid these inconveniences and increase the washer elasticity, the washer according to this invention is provided on the one hand, on its two faces, with successive or alternate ribs and grooves disposed along at least one circle and with a reverse order or sequence from one face to the other face, and on the other hand with blind holes made through the washer material in a plane intermediate the two faces of the washer and directed obliquely in relation to the washer's radii.

The washers are stacked by reversing the corresponding faces brought in mutual contact, i.e., by causing the ribs of one face of a washer to engage the grooves of the same face of another washer, and vice versa, but with an angular shift, so that the oblique holes of one washer cross the oblique holes of the other washer.

Thus, a coherent stacking of elastic washers is obtained, which precludes any risk of side-slip, and has a lesser compressive resistance than solid washers.

Brief description of the drawing

A more detailed description of a typical form of embodiment of an elastic washer according to this invention will now be described by way of example with reference to the attached diagrammatic drawing, in which:

FIGURE 1 is a plan view showing one face of a washer;

FIGURE 2 is a similar view of the opposite face;
FIGURE 3 is a side view;
FIGURE 4 is a plan view of a pair of superposed washers;
FIGURE 5 is a side view of the assembly of FIGURE 4.

Description of the preferred embodiment

This elastic washer consisting of a suitable elastomer comprises a central annular portion 1 limited laterally by two parallel faces 2 and 3, and an adjacent annular peripheral portion 4 limited by tapered surfaces 5 and 6 of same or unequal inclination, and disposed in the same or in opposite directions.

Formed on the faces 2 and 3 preferably along one or more circles are alternate series of ribs 7 and grooves 8 so that any risk of side-slip of the washer is practically precluded by the crossed assembly resulting from these interengaging means.

These grooves and ribs are preferably of semi-cylindrical cross-section contour and in the case of a 0.4" thick washer the radius of these grooves and ribs may be for example 0.01".

In a plane intermediate its faces 2 and 3 the washer has blind holes 9 formed therein which may have a variable relative arrangement.

In the example illustrated and for the sake of simplification it is assumed that the washer comprises four blind holes 9 spaced 90° apart and having their axes substantially tangent to the central hole 10.

In practice the number of blind holes will preferably be greater and their axes disposed obliquely in relation to the washer's radii.

In the example illustrated the blind holes are cylindrical and their diameter may be of the order of 3 to 4 mm.

By properly disposing the registering faces 2 and 3 of the washers, a coherent assembly may be obtained by stacking a plurality of washers 1, with the ribs 7 of one face engaging the grooves 8 of the adjacent face of another washer turned upside down, and vice-versa; under these conditions, it is clear that the washers cannot slip laterally due to the groove-engaging ribs constituting as many abutments.

Moreover, the holes 9 of one washer are disposed across the holes 9 of the adjacent washer, thus avoiding adjacent weaker zones in the stacking.

These elastic washers, due to the presence of these internal cavities, have a lesser resistance to crushing or compressive forces than solid washers, and therefore a greater elasticity.

This factor may be modified by providing a greater or smaller number of blind holes, and also by changing their shape, dimensions and inclination in relation to the washer's radii.

What I claim is:

1. A washer made of relatively hard plastic material of the polyurethane elastomer type, which comprises two flat parallel circular faces and frustoconical convergent edges joining the two faces to a peripheral side surface, said washer having a central opening therethrough, and on each face on the one hand a series of alternate ribs and grooves disposed along at least one circle throughout a circumferential extent of said face and with a reverse sequential order from one face to the other, and on the other hand blind holes formed in the thickness of the washer and in an oblique direction in relation to the washer's radii, said blind holes extending inwardly from the peripheral side surface.

2. A stacking of washers as set forth in claim 1, characterized in that each of said washers is superposed with respect to the adjacent washer, and with the respective washers of each pair of adjacent washers being disposed with their opposite faces in contact to permit the engagement of the ribs of one face into the grooves of the other face and the squeezing of said blind holes.

References Cited

UNITED STATES PATENTS

| 1,180,561 | 4/1916 | Bateman | 151—34 |
| 1,670,890 | 5/1928 | Illmer | 85—50 |
| 2,547,941 | 4/1951 | Heftler | 85—50 |
| 3,298,271 | 1/1967 | Krueger | 85—50 |

RAMON S. BRITT, Primary Examiner